(12) United States Patent (10) Patent No.: US 9,351,117 B2
Kadous et al. (45) Date of Patent: May 24, 2016

(54) USE OF A TRAINED CLASSIFIER TO PREDICT DISTANCE BASED ON A PAIR OF WIRELESS SCANS

(71) Applicant: Google Inc., Mountain View, CA (US)

(72) Inventors: Mohammed Waleed Kadous, Santa Clara, CA (US); Brian Patrick Williams, Mountain View, CA (US); Etienne Le Grand, Mountain View, CA (US)

(73) Assignee: Google Inc., Mountain View, CA (US)

( * ) Notice: Subject to any disclaimer, the term of this patent is extended or adjusted under 35 U.S.C. 154(b) by 149 days.

(21) Appl. No.: 13/972,738

(22) Filed: Aug. 21, 2013

(65) Prior Publication Data

US 2015/0057014 A1 Feb. 26, 2015

(51) Int. Cl.
*H04W 64/00* (2009.01)
*H04W 4/02* (2009.01)

(52) U.S. Cl.
CPC .................... *H04W 4/023* (2013.01)

(58) Field of Classification Search
CPC ....... H04W 4/02; H04W 12/06; H04W 4/023; H04W 64/003; H04M 2207/18; H04M 2242/30
USPC ................. 455/456.1, 456.2, 456.3, 434, 411
See application file for complete search history.

(56) References Cited

U.S. PATENT DOCUMENTS

| | | | | |
|---|---|---|---|---|
| 7,907,564 B2 * | 3/2011 | Laux | ..................... | H04W 24/00 370/329 |
| 8,504,021 B1 * | 8/2013 | Blinn | ................ | H04W 36/0061 370/331 |
| 8,665,847 B2 * | 3/2014 | Holostov | ................. | H04W 4/02 370/338 |
| 2009/0103503 A1 * | 4/2009 | Chhabra | ............... | H04W 48/20 370/338 |
| 2011/0260922 A1 * | 10/2011 | Zhang | ................... | G01S 5/0252 342/451 |
| 2013/0090106 A1 * | 4/2013 | Mathews | ................ | H04W 4/00 455/418 |
| 2013/0190018 A1 * | 7/2013 | Mathews | .............. | H04W 4/023 455/456.6 |
| 2013/0337847 A1 * | 12/2013 | Sridhara | ................... | G01S 5/14 455/456.6 |
| 2014/0211691 A1 * | 7/2014 | Emadzadeh | .......... | H04W 64/00 370/328 |
| 2014/0287773 A1 * | 9/2014 | Agerstam | ............. | H04W 48/16 455/456.1 |

* cited by examiner

*Primary Examiner* — Sharad Rampuria
*Assistant Examiner* — Obidon Bassinan
(74) *Attorney, Agent, or Firm* — McDonnell Boehnen Hulbert & Berghoff LLP

(57) ABSTRACT

The present disclosure describes methods, systems, and apparatuses for determining the distance between two wireless scans of a mobile computing device. The distance is determined by scanning for wireless networks with a computing device. The scanning includes a receiving a plurality of network attributes for each wireless networks within the range of the mobile computing device. Further, the distance is determined by comparing the plurality of network attributes from the scanning with a reference set of network attributes. The comparing of network attributes is used to determine an attribute comparison. Finally, the distance between a position associated with the reference set of network attributes and the computing device, based on the attribute comparison, determines a position associated with the network.

17 Claims, 5 Drawing Sheets

USE OF A TRAINED CLASSIFIER TO PREDICT DISTANCE BASED ON A PAIR OF WIRELESS SCANS

BACKGROUND

Typically, the location of a mobile phone is determined based either on Global Positioning System (GPS) data or on data associated with a wireless access point, such as a cellular base station or an 802.11 access point. For example, a mobile computing device may receive a GPS signal and responsively determine its position on the face of the Earth (e.g. an absolute location). In a different example, a mobile computing device may receive a signal from either a cellular base station or an 802.11 access point. The cellular base station or an 802.11 access point may know its exact location. Based on the location of either the cellular base station or an 802.11 access point, the mobile computing device can calculate its exact position.

SUMMARY

Knowing the absolute position of a mobile computing device may be beneficial for providing location-based services. However, it may also be desirable to know relative position information of a mobile computing device as opposed to absolute position information. In some instances, position information from either GPS or a wireless base station (either cellular or 802.11) may be unavailable to the mobile computing device. Further, sometimes the position information from either GPS or a wireless base station may not have enough precision to determine relative position information. Disclosed herein are methods, systems, and apparatuses for determining a distance between a position from which a first set of network attributes were obtained and a position from which a second set of network attributes were obtained.

A first aspect includes a method that determines the distance between two wireless scans. The method includes scanning for wireless networks with a computing device. The scanning includes a receiving a plurality of network attributes for a plurality of wireless networks within the range of the mobile computing device. The network attributes include data related to a received power of a radio signal from a wireless base station for respective wireless networks of the plurality of wireless networks. Additionally, the attributes include a unique identification for each wireless network of the plurality of wireless networks. Further, the method includes comparing the plurality of network attributes from the scanning with a reference set of network attributes. The comparing of network attributes is used to determine an attribute comparison. Similar to the network attributes from the scanning, the reference set of network attributes includes a reference power (e.g. signal strength indicator) for each reference wireless network of the plurality of reference wireless networks. The reference set of network attributes also includes a unique identification for each reference wireless network of the plurality of reference wireless networks. Additionally, the method includes determining a distance between a position from which the reference set of network attributes were obtained and a position from which the plurality of network attributes were obtained. The determining is based on a correlation between the attribute comparison and a set of previously-captured attribute comparisons, where the set of previously-captured attribute comparisons is based on a plurality of previously-captured wireless scans.

In some embodiments, the method includes storing data for the reference set of network attributes. The reference set of network attributes may be based on a reference scanning for wireless networks with a computing device. The method may also include comparing the plurality of network attributes by determining a union of each of the plurality of wireless networks from the scanning and each of a plurality of reference wireless networks from the reference set of network attributes. In additional embodiments, the method may include comparing the plurality of network attributes by determining an intersection of each of the plurality of wireless networks from the scanning and each of a plurality of reference wireless networks from the reference set of network attributes. Additionally, the method may include comparing the plurality of network attributes by determining a difference of an average power of the power for each wireless network of the plurality of wireless networks and an average power of the reference wireless networks. And in some embodiments, the network attributes do not include absolute position information.

A second aspect includes a control system that determines the distance between two wireless scans. The control system includes at least one processor and a memory having stored thereon instructions that, upon execution by the at least one processor, cause the control system to perform functions. The functions include scanning for wireless networks with a computing device. The scanning includes a receiving a plurality of network attributes for a plurality of wireless networks within the range of the mobile computing device. The network attributes include data related to a received power of a radio signal from a wireless base station for respective wireless networks of the plurality of wireless networks. Additionally, the attributes include a unique identification for each wireless network of the plurality of wireless networks. Further, the functions include comparing the plurality of network attributes from the scanning with a reference set of network attributes. The comparing of network attributes is used to determine an attribute comparison. Similar to the network attributes from the scanning, the reference set of network attributes includes a reference power for each reference wireless network of the plurality of reference wireless networks. The reference set of network attributes also includes a unique identification for each reference wireless network of the plurality of reference wireless networks. Additionally, the functions include determining a distance between a position from which the reference set of network attributes were obtained and a position from which the plurality of network attributes were obtained. The determining is based on a correlation between the attribute comparison and a set of previously-captured attribute comparisons, where the set of previously-captured attribute comparisons is based on a plurality of previously-captured wireless scans.

In some embodiments, the functions include storing data for the reference set of network attributes. The reference set of network attributes may be based on a reference scanning for wireless networks with a computing device. The functions may also include comparing the plurality of network attributes by determining a union of each of the plurality of wireless networks from the scanning and each of a plurality of reference wireless networks from the reference set of network attributes. In additional embodiments, the functions may include comparing the plurality of network attributes by determining an intersection of each of the plurality of wireless networks from the scanning and each of a plurality of reference wireless networks from the reference set of network attributes. Additionally, the functions may include comparing the plurality of network attributes by determining a difference of an average power of the power for each wireless network of the plurality of wireless networks and an average power of the reference wireless networks. And in some embodiments, the network attributes do not include absolute position information.

A third aspect includes an apparatus that determines the distance between two wireless scans. The apparatus includes a wireless chipset configured to scan for wireless networks and the associated network attributes for each wireless network. The apparatus also includes a memory. The memory is configured to store data associated with the scan for wireless networks and the associated network attributes for each wireless network. The network attributes include a plurality of network attributes for each of a plurality of wireless networks. The network attributes include a power for each wireless network of the plurality of wireless networks and a unique identification for each wireless network of the plurality of wireless networks. Additionally, the memory is configured to store data associated with a reference set of network attributes. The data associated with a reference set of network attributes includes a reference power for each reference wireless network of the plurality of reference wireless networks and a unique identification for each reference wireless network of the plurality of reference wireless networks. Further, the apparatus includes at least one processor. The processor is configured to compare the plurality of network attributes from the scanning with the reference set of network attributes to determine an attribute comparison. Additionally, the processor is configured to determine a distance between a position from which the reference set of network attributes were obtained and a position from which the plurality of network attributes were obtained. The determining is based on a correlation between the attribute comparison and a set of previously-captured attribute comparisons, where the set of previously-captured attribute comparisons are based on a plurality of previously-captured wireless scans.

The apparatus may also include the processor being configured to compare the plurality of network attributes by determining a union of each of the plurality of wireless networks from the scanning and each of a plurality of reference wireless networks from the reference set of network attributes. In additional embodiments, the processor may also be configured to compare the plurality of network attributes to determine an intersection of each of the plurality of wireless networks from the scanning and each of a plurality of reference wireless networks from the reference set of network attributes. Additionally, the processor may also be configured to compare the plurality of network attributes by determining a difference of an average power of the power for each wireless network of the plurality of wireless networks and an average power of the reference wireless networks. And in some embodiments, the network attributes do not include absolute position information.

DETAILED DESCRIPTION

The following detailed description includes references to the accompanying figures. In the figures, similar symbols typically identify similar components, unless context dictates otherwise. The example embodiments outlined in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

Figure 1:
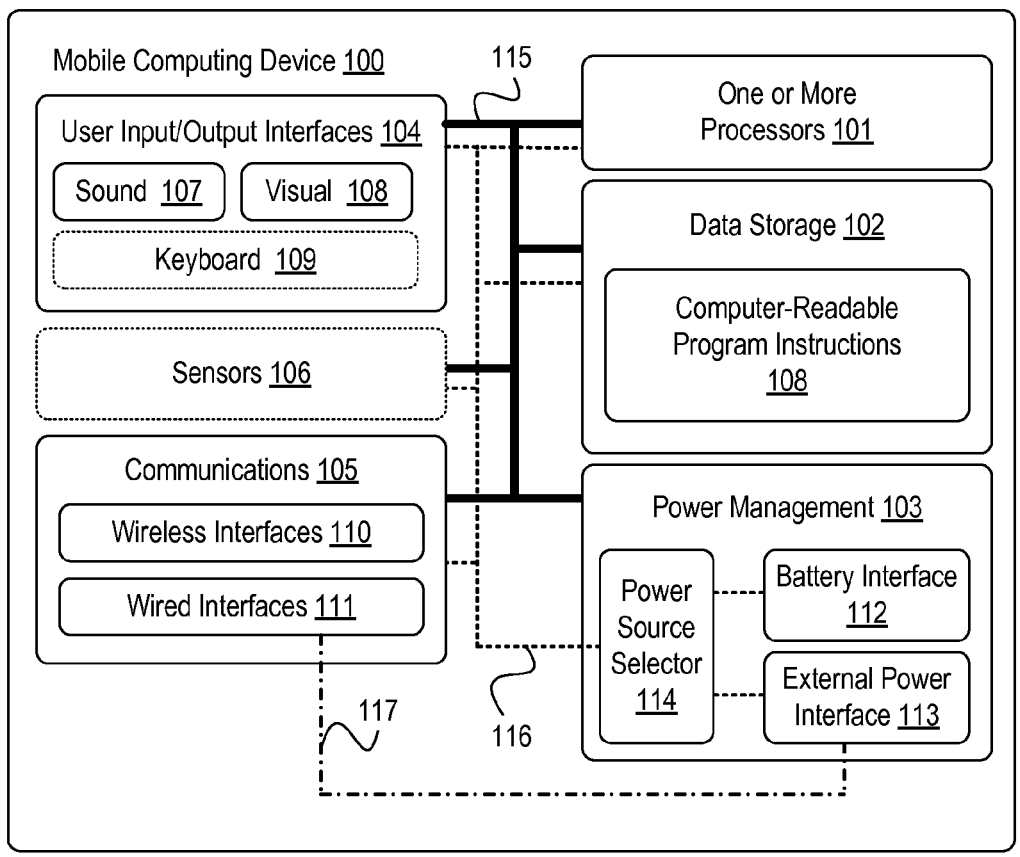
FIG. 1 shows an example of a simplified block diagram of a mobile computing device according to some embodiments.

FIG. 1 shows an example of a simplified block diagram of a mobile computing device 100 according to some embodiments. In some embodiments, the mobile computing device 100 may be a mobile telephone, cellular telephone, smartphone or similar mobile communications device now known or later developed that may contain wireless access components. In other embodiments, the mobile computing device 100 may be a laptop computer, tablet computer, or other type of mobile computing device now known or later developed that may be include wireless 802.11 features.

The mobile computing device 100 includes a plurality of components, such as one or more processors 101, data storage 102, power management sub-system 103, user input/output interfaces 104, communications interfaces 105, and sensors 106. The individual components are connected via one or more data busses 115 or similar communications connections that are configured to enable the individual components to send and receive data to and from other components of the mobile computing device 100. The individual components are also connected to the power management sub-system 103 via a power distribution bus 116 or similar connection that is configured to provide operating power to the individual components of the mobile computing device 100.

The one or more processors 101 may include any type of general purpose processor (e.g., processors from Intel, Advanced Micro Devices (AMD), etc.) or any type of special purpose processors (e.g., application specific integrated circuits (ASICs), digital signal processors (DSP), Coder/Decoders (CODECs), etc.) now known or later developed.

The data storage 102 is configured to store data as well as computer-readable program instructions 108. The data storage 102 may include any of the types of data storage described herein, including short term volatile memory (e.g., RAM) for storing data and/or program code or instructions during execution of the program code or instructions and/or longer-term non-volatile memory (e.g., ROM) for storing data and/or program code or instructions. In some embodiments, the data storage may be implemented as solid state and/or flash memory or other similar types of small form factor storage media.

The power management sub-system 103 includes a battery power interface 112, an external power interface 113, and a power source selector 114. The battery power interface 112 is configured to receive operating power from a battery source, such as an internal battery, a removable battery that is electrically coupled to the mobile computing device 100, or any other sort of battery or similar type of portable power supply now known or later developed. The battery that supplies operating power for the mobile computing device 100 via the battery interface 112 may be rechargeable or non-rechargeable.

The external power interface 113 is configured to receive power from an external power source for the mobile computing device 100. Examples of external power sources include electrical wall outlets, desktop docking stations, car docking stations or power cables, alarm clocks or entertainment systems with docking stations, or any other type of connection or device that is configured to provide the mobile computing device 100 with operating power so that the mobile computing device 100 does not need to rely on operating power from a battery via the battery interface 112.

In some embodiments, the power source selector 114 may be configured to selectively provide operating power from one of the battery interface 112 or the external power interface 113. In embodiments with rechargeable batteries, when an external power source is connected via the external power interface 113, the power source selector 114 may be configured to both (i) provide operating power to the mobile computing device 100 from the external power supply via the external power interface 113 and (ii) charge the battery with power from the external power supply by providing an electrical connection from the external power interface 113 to the battery interface 112.

The user input/output interfaces 104 include a plurality of input and output components, such as sound input/output components 107, display input/output components 108, and an optional keyboard 109. The sound components 107 may include a microphone or other similar type of sound detection device now known or later developed that is configured to detect and receive sound waves. The sound components 107 may also include one or more speakers or similar sound generation devices now known or later developed that are configured to generate sound waves.

The display input/output components 108 may include a Liquid Crystal Display (LCD), plasma display, or similar type of display device now known or later developed that is configured to display a graphical user interface and/or other information to a user. In some embodiments, the display 108 may include a touch-screen interface or other touch-sensitive components to enable a user to enter commands or other information (or otherwise interact with) the mobile computing device 100. In some embodiments, the display 108 may be configured to generate and display a virtual keyboard for data entry by a user. In other embodiments, the mobile computing device 100 may optionally include a physical keyboard 109. However, a keyboard (virtual or physical) is not required in all embodiments. Some embodiments may also include one or more external switches or buttons (not shown) to turn the mobile computing device 100 on or off, to wake the device from a sleep state, to control volume or other similar functions.

The communications interfaces 105 may include one or more wireless communications interfaces 110 and one or more wired interfaces 111. The wireless interfaces 110 may include any type of wireless communications interface configured to transmit and receive data according to any of a number of different wireless communications protocols, such as Bluetooth, Bluetooth Low Energy, IEEE 802.11 (IEEE 802.11 may refer to IEEE 802.11-2007, IEEE 802.11n-2009, IEEE 802.11ac, IEEE 802.11ad, or any other IEEE 802.11 revision) or other Wi-Fi variant, Code-Division Multiple Access (CDMA), Global System for Mobile Communications (GSM), 3rd Generation (3G), 4th Generation (4G), 3rd Generation Partnership Project—Long Term Evolution (3GPP-LTE), Worldwide Interoperability for Microwave Access (WiMAX), Zigbee, General Packet Radio Service (GPRS), Evolution-Data Optimized (EV-DO), High-Speed Downlink Packet Access (HSDPA), or any other type of wireless communications protocol now known or later developed.

The communications interface 105 may also be configured to scan for wireless networks. A wireless scan may determine what networks are within the range of the mobile computing device 100. Additionally, the wireless scan may save data associated with the wireless scan to the data storage 102. The data may include the date and time the scan was made and also attributes for each of the networks within the range of the mobile computing device 100.

The wired interfaces 111 may include any type of wired communications interface (e.g., electrical, optical, etc.) configured to transmit and receive data according to any of a number of different communications protocols, such as Universal Serial Bus (USB), Ethernet, IEEE 1394, Firewire, Thunderbolt, or any other type of serial or parallel data communications protocol now known or later developed. The wired interfaces 110 and wireless interfaces 111 may be configured to communicate with other computing or communications devices via networks, e.g. the Internet, and/or communicate with peripheral devices, such as disk drives, external monitors, mouse or trackball/pad devices, and external keyboards etc., via Bluetooth, USB, or similar connections. In some examples, mobile computing device 100 may use wired interfaces 110 and/or wireless interfaces 111 to communicate with a server that performs speech recognition on behalf of mobile computing device 100.

In some embodiments, the wired communications interface 111 may also be configured to provide operating power via the external power interface 113 as shown by power connection 117 from the wired interface 111 to the external power interface 113. For example, USB is one type of wired communications interface that can be configured to provide both communications and power.

Some embodiments of the mobile computing device 100 may also include one or more sensors 106. The sensors 106 may include any one or more cameras or other image sensors, accelerometers, Global Positioning System (GPS) sensors, temperature sensors, or any other type of sensor known now or later developed that may be desirable to integrate with the mobile computing device 100.

Figures 2A, 2B:
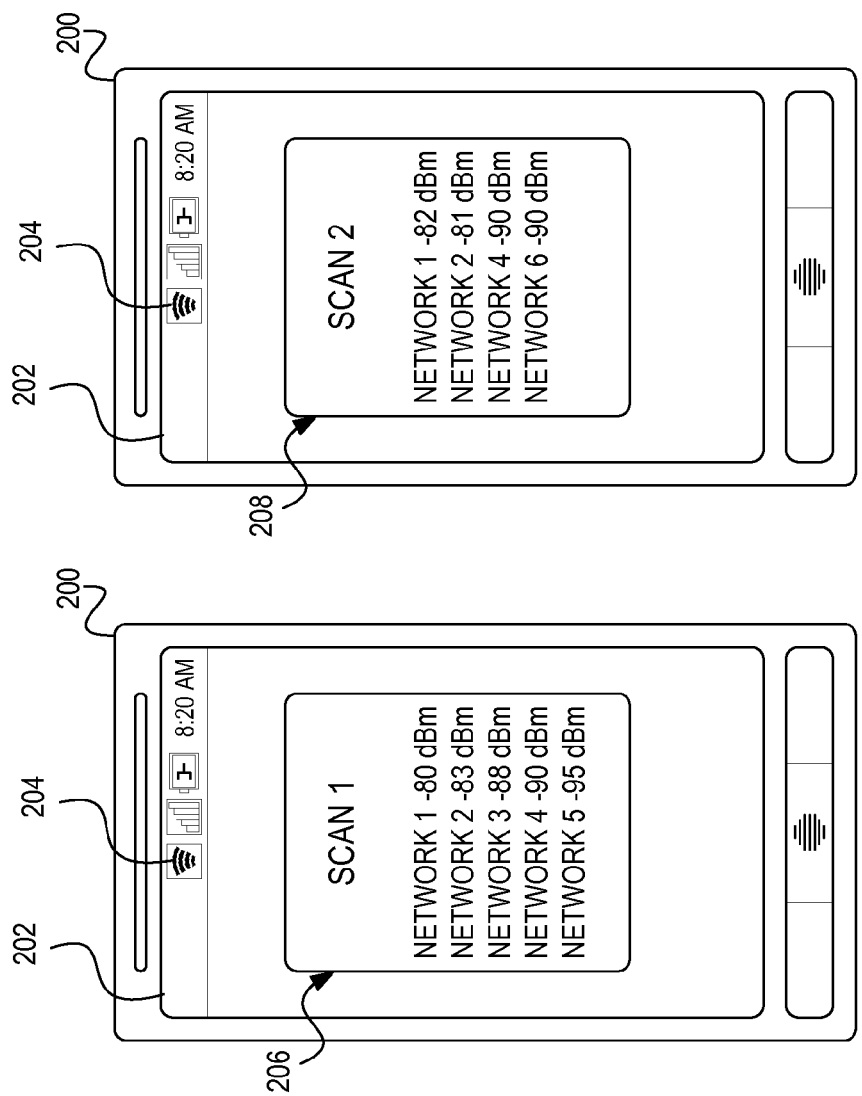
FIGS. 2A-2B show examples of a mobile computing device performing wireless scans.

FIGS. 2A-2B show an example of a mobile computing device 200 performing a wireless scan according to some embodiments. The mobile computing device 200 may be similar to the mobile computing device 100 shown and described with respect to FIG. 1. The mobile computing device 200 may include a display 202. The display 202 may provide an indication 204 that there is at least one 802.11 wireless network within the range of mobile computing device 200. Similarly, the mobile computing device 200 may be configured to perform a wireless scan of wireless networks. The wireless scan may measure and calculate various attributes of wireless networks within the vicinity of the mobile computing device 200. Additionally, the mobile computing device 200 may be configured to display the results of a wireless scan (SCAN 1 206 and SCAN 2 208).

When a wireless scan is initiated, the mobile computing device 200 uses the wireless hardware in the communications module to scan for wireless networks and determine which wireless networks are within range of the mobile computing device 200. A wireless scan may either be initiated by an operator of the mobile computing device 200 or the wireless scan may be triggered by the mobile computing device 200 itself. In some embodiments, the wireless scan may be initiated based on either the mobile computing device 200 trying to connect to a wireless network or the mobile computing device 200 trying to determine its location. Further, the wireless scan may be triggered by other means as well, not limited to those previously discussed.

In response to completing a wireless scan, the mobile computing device 200 will store data related to at least some attributes associated with the wireless scan to a memory of the mobile computing device 200. Additionally, the mobile computing device 200 might transmit the data related with the wireless scan to a remote server for storage and processing. Further, the mobile computing device 200 may display some of the attributes of the wireless scan on the display 202. For example, after a first scan, mobile computing device 200 may display the results for the scan as SCAN 1 206. The results in SCAN 1 206 may display the various networks (and the associated received wireless power of each network) within the range of the mobile computing device 200 for that respective scan. Additionally, after a second scan, mobile computing device 200 may display the results for the scan as SCAN 2 208. The results in SCAN 2 208 may display the various networks (and the associated received wireless power of each network) within the range of the mobile computing device 200 for the second scan.

The data stored with each respective wireless scan may vary depending on the specific embodiment. However, generally, the data stored will include at least the media access control address (MAC address) of each wireless access point (AP) within the range of the mobile computing device 200, the number of APs within the range of the mobile computing device 200, and a signal strength associated with each AP within the range of the mobile computing device 200. The MAC address of an AP is a unique identifier for each AP. Additionally, the data may include a service set identification (SSID) of the wireless network associated with each AP. Further, the mobile computing device 200 may store a power level of each respective wireless network. Additionally, in other embodiments, more or less data may be stored for each given wireless scan. In one example, the wireless scan may be a compilation of several scans performed simultaneously across various network technologies. In this example, a wireless scan may perform a scan of both 802.11, cellular, and other wireless networks simultaneously. The computing device 200 may store data related to all the wireless networks.

FIG. 2A shows the results of a first scan as SCAN 1 206 and FIG. 2B shows the results of a second scan SCAN 2 208. SCAN 1 206 shows the scan found five networks, Networks 1-5. SCAN 2 208 shows the scan found four networks, Networks 1-2, Network 4, and Network 6. Once two scans are made, computing device 200 may be able to calculate the distance between a location where the first scan occurred and the location where the second scan occurred based on the data associated with the two scans. The distance between a location where the first scan occurred and the location where the second scan occurred can be calculated without knowing any absolute position information for either scan. For example, the computing device 200 may not know any location information related to any APs from the scans. However, it still may be able to calculate the distance based on the data associated with the two scans. In some embodiments, possibly either one of the first or second scan may have some associated absolute position information. The distance calculation presented herein will be able to determine the distance between the two scans without using the absolute position information. The distance calculation will be discussed further with respect to FIG. 3.

In some additional embodiments, different devices may perform the two scans. A first mobile communication device may perform the first scan and a second mobile communication device may perform the second scan. The two mobile computing devices may exchange data directly with each other, or via another computing device (such as a networked computer server) and calculate the distance between the two scans while only having performed one scan directly.

Figure 3:
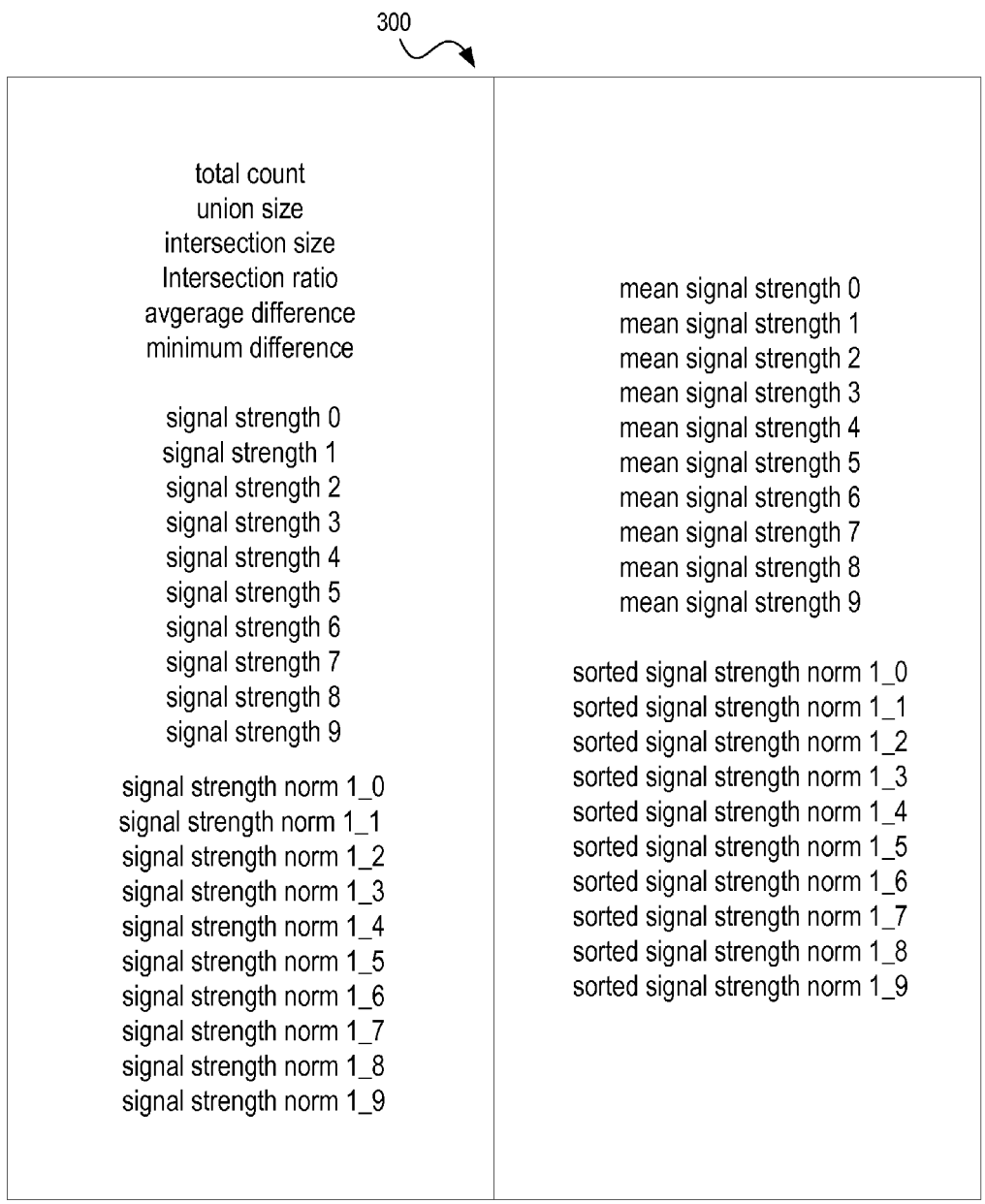
FIG. 3 shows an example set of attributes related to a pair of wireless scans.

FIG. 3 shows an example set of attributes 300 related to a pair of scans. In one embodiment, the attributes 300 shown in FIG. 3 are used to calculate the distance between two scans. In other embodiments, the specific attributes used may be varied from those shown in FIG. 3.

Each of the attributes 300 shown in FIG. 3 will be discussed here with respect to 802.11 (WiFi) scans. However, other attributes may be used depending on the type of wireless network from which the attributes came. Each wireless scan may find a number of wireless APs, each having an associated signal strength. The signal strength of an AP may be measured in dBm (i.e. power ratio in decibels of the measured power referenced to one milliwatt). For a mobile device receiving a signal from a typical AP, −50 dBm is a strong power level and −90 dBm is a weak power level. For a laptop measuring a received signal from a typical AP, −30 dBm is a strong power level and −90 dBm is a weak power level.

With respect to attribute discussed below, the first scan means the scan represented by SCAN 1 206 of FIG. 2A and the second scan means the scan represented by SCAN 2 208 of FIG. 2B.

The "total count" attribute is the summed total number of APs found in the first scan and the second scan. For example, if the first scan finds 5 networks, each with its own AP, and the second scan finds 4 networks, each with its own AP, the "total count" attribute is equal to 9 (e.g. 5+4=9).

The "union size" attribute is the number of APs in the union between APs seen in the first scan and the second scan. A union is a list of each individual item that appears in either set of scans. Here, the union would be the list of individual APs. For example, if the first scan finds 5 networks, Networks 1-5 each with its own AP, and the second scan finds 4 networks, Networks 1-2, Network 4, and Network 6 each with its own AP, there are 6 different networks. Because each network has its own AP, the "union size" attribute is equal to 6 (i.e. Networks 1-6).

The "intersection size" attribute is the number of APs in the intersection between APs seen in the first scan and the second scan. An intersection is a list of individual item that appears in both scans. Here, the intersection would be the list of APs that appeared in each scan. For example, if the first scan finds 5 networks, Networks 1-5 each with its own AP, and the second scan finds 4 networks, Networks 1-2, Network 4, and Network 6 each with its own AP, there are 6 different networks. However, because Networks 1-2 and Network 4 appeared in both scans, the "intersection size" attribute is equal to 3.

The "intersection ratio" attribute is the ratio of the intersection size to union size. In the present example, the "intersection ratio" attribute equals 1/2 (e.g. 3 intersection APs divided by 6 union APs). The "intersection ratio" may take the form of a ratio, such as 1/2, as a decimal representation of the ratio, such as 0.5, or as a percentage, such as 50%.

The "average difference" attribute is the average difference between signal strengths for APs within range of the mobile computing device. As previously discussed, the signal strength of an AP is typically measured in dBm. The "average difference" attribute calculates the difference between the average signal strength of all APs found by the first scan the average signal strength of all APs found by the second scan. For example, if the average AP in the first scan had a power equal to −85 dBm and the average AP in the second scan had a power equal to −95 dBm, the average difference would be 10 dBm. In some embodiments, the "average difference" attribute may be calculated for only the APs that form the intersection (i.e. only APs that are common to both the first and second scan). In other embodiments, the "average difference" attribute may be calculated across all APs found by the mobile computing device.

The "minimum difference" attribute is the smallest difference between signal strengths for APs. Depending on the specific embodiment, the "minimum difference" attribute may be calculated in one of two ways. In a first embodiment, the signal strength for each AP in the first scan is compared with the signal strength for the same respective AP of the second scan. The smallest difference in signal power is the "minimum difference" attribute. In a second embodiment, the "minimum difference" attribute is calculated based on the smallest difference in power between any of APs found in the first scan with the signal strength of any of the APs of the second scan.

The attributes "signal strength 0" through "signal strength 9" are equal to the average signal strength of access points found in the intersection set of the various discovered APs (i.e. APs that are found in both a current scan and a reference scan). The "signal strength 0" through "signal strength 9" attributes are sorted based on the strongest signals to the least strong signals. If there is no signal present for the respective attribute, the attribute will be assigned the value of −110 dBm. Depending on the specific embodiment, the "signal strength 0" through "signal strength 9" attributes may be created for each respective scan or the attributes may correspond to the combinations of the first and second scan. The attributes "signal strength norm 0" through "signal strength norm 9" represent the norms (i.e. absolute difference) for the signals in the same order as attributes "signal strength 0" through "signal strength 9". For example, considering the scans shown in FIGS. 2A and 2B, the "signal strength 0" through "signal strength 5" may equal −81 dBm (the mean for Network 1), −82 dBm (the mean for Network 2), and −90 dBm (the mean for Network 4). The associated "signal strength norm 0" through "signal strength norm 4" attributes may equal 2 dB, 2 dB, and 0 dB.

The attributes "sorted signal strength norm 1_0" through "sorted signal strength norm 1_9" are equal to the absolute difference between the measured strengths of the various discovered APs. The "sorted signal strength norm 1_0" through "sorted signal strength norm 1_9" attributes are sorted based on the lowest absolute difference to the highest absolute difference. If there is no signal present for the respective attribute, the attribute will be assigned the value of 100 dBm. The attributes "mean signal strength 0" through "mean signal strength 9" represent the average strength for the signals of the various discovered APs, in the same order as attributes "sorted signal strength norm 1_0" through "sorted signal strength norm 1_9". For example, the "sorted signal strength norm 1_0" through "sorted signal strength norm 1_3" may equal 0 dB, 2 dB, and 2 dB. The associated "mean signal strength 0" through "mean signal strength 3" attributes may equal to −90 dBm, −81 dBm, and −82 dBm.

The above-referenced attributes are used with respect to a classifier (e.g. a training function). The classifier is configured to calculate a correlation between the attributes and the distance between two wireless scans. The correlation is calculated based on a comparison of the attributes from two wireless scans and a known distance between the two scans. In one embodiment, a first and a second wireless scan are created with either one or two mobile computing devices. Additionally, the distance between the location of the first wireless scan and the location of the second wireless scan is recorded. During training, each mobile computing device may also record the absolute location of the respective wireless scan. Thus, a distance between each scan may be calculated after both scans are made. Based on the distance between the two scans and the associated attributes of the two scans, the classifier may determine a functional relationship between the set of attributes and the distance between the two scans.

For example, a first wireless scan may identify a plurality of wireless networks. Each network discovered by the first wireless scan may have an associated received power level and base-station identification. The received power level and base-station identification associated with the respective networks of the first scan may be stored in a memory. Additionally, the first scan may be performed at a first location. A second wireless scan may identify a second plurality of wireless networks. Each network discovered by the second wireless scan may also have an associated received power level and base-station identification. The received power level and base-station identification associated with the respective networks of the second scan may be stored in a memory as well. Additionally, the second scan may be performed at a second location. The classifier may create an attribute comparison, similar to that described with respect to FIG. 3. Additionally, the classifier may determine a distance between the first location and second location. Thus, the classifier will know the distance between the two scans and respective attribute comparison. The process above may be repeated many times for various pairs of wireless scans. After a plurality of scans has been analyzed, the classifier may determine a functional relationship between an attribute comparison and a pair of scans. Thus, the functional relationship defines the distance between the location where each of two wireless scans were performed based on the attribute comparison associated with the two scans.

The classifier may be used with training data (e.g. pair of wireless scans) from a wide variety of locations. By using pair of scans from many locations, the classifier may be able to better predict distance between scans at locations from which data has never been used before. For example, pairs of scans used with the classifier may be taken from various locations indoors and outdoors. Indoor examples may include public locations with wireless access, such as shopping malls, office buildings, and sports venues. Outdoor locations may include parks, public streets, etc.

By obtaining pairs of scans the classifier may learn to generalize an estimated distance for a new pair of scans at some unseen location. Implicitly, the training algorithm is learning what a typical distribution of wireless access points is like in the world. The training algorithm may include one of (or several) different machine-learning algorithms. In one example, the classifier may use a tree-based machine-leaning approach, such as the REPTree implementation of Weka (Waikato Environment for Knowledge Analysis) with bagging. Other tree-based machine-learning approaches may work as well. In additional embodiments, the classification may take the form of a decision tree, a support vector machine, a neural network, a boosted cascade, or other detection model.

The classifier may be run on either a mobile computing device or a networked computer server. For example, a user of a mobile computing device may choose to share the results of a wireless scan with the networked computer server. The mobile computing device may share only the data related to the wireless scan, but no user-specific data. Based on a plurality of wireless scans being shared with the networked computer server, the networked computer server may analyze the wireless scans with the classifier. Once the classifier has received a plurality of scans, it may be able to determine the distance between two wireless scans without needing absolute position information of any respective wireless scan. The output of the classifier (or training algorithm) may be a set of data that may be communicated from a server to the mobile device. Once the mobile device receives the data, it may be able to execute calculations on its own without having to communicate with the networked server (or other computing device).

In some embodiments, a plurality mobile computing devices may each be communicably coupled with the networked computer server. The networked computer server may continuously perform the classifier on the received wireless scan data that includes absolute position information. The networked computer server may include a network interface configured to receive information related to wireless scans, a memory configured to store information related to wireless scans, and a processor configured to perform functions as described herein. Further, the network interface may be further configured to transmit information to mobile computing devices related to calculations performed as described herein.

When the distance between two wireless scans is requested by a mobile computing device, the networked computer server may perform one of two functions. First, the networked computer server may receive data from the two wireless scans, determine the distance between the two scans, and return the distance to the mobile computing device. In a second embodiment, the classifier on the networked computer server may determine a function, based on the previously-discussed classifier, that determines the distance between two scans based on attributes of the respective scans. The networked computer server may communicate this functional relationship to various mobile computing devices. Thus, once a mobile computing device receives the functional relationship communicated by the networked computer server, the mobile computing device may be able to calculate the distance between two wireless scans without having to communicate any data to the networked computer server.

Figure 4:
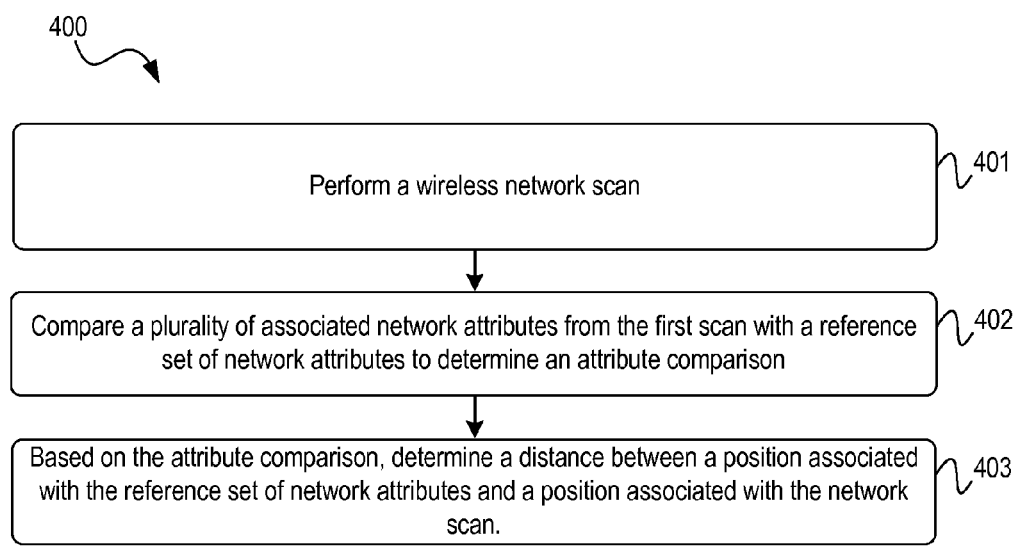
FIG. 4 shows an example method according to some embodiments.

FIG. 4 shows an example method 400 according to some embodiments. The method 400 begins at block 401, where a computing device scans for wireless network. When a scan for wireless networks (i.e. wireless scan) is initiated, the mobile computing device uses the wireless hardware to determine which networks are within range of the mobile computing device. An operator of the mobile computing device may either initiate a wireless scan or the mobile computing device itself may trigger the wireless scan. In some embodiments, the wireless scan may be initiated based on either the mobile computing device trying to connect to a wireless network or the mobile computing device trying to determine its location. Further, the wireless scan may be triggered by other means as well, not limited to those previously discussed.

The wireless scan finds wireless networks are within range of the mobile computing device. Based on the wireless scan, a plurality of network attributes is determined for wireless networks within the range of the mobile computing device. The network attributes include at least a respective power for each respective wireless network of the plurality of wireless networks and a unique identification for each respective wireless network of the plurality of wireless networks. Other attributes include those previous discussed in the present disclosure, such as an SSID for each wireless network and a MAC address for each wireless network. The mobile device may communicate the results from the wireless scan to a server for further processing.

At block 402, the mobile computing device compares the plurality of network attributes from the scanning with a reference set of network attributes to determine an attribute comparison. The reference set of network attributes includes a reference power for each reference wireless network of the plurality of reference wireless networks and a unique identification for each reference wireless network of the plurality of reference wireless networks. The reference set of network attributes may be based on a previously performed wireless scan. The previously performed wireless scan may have been performed with the same mobile computing device that performed the wireless scan at block 401. In other embodiments, the previously performed wireless scan may have been performed with a different mobile computing device that performed the wireless scan at block 401.

For example, the comparison may include creating a set of parameters, such as those discussed with respect to FIG. 3. Parameters may includes a "total count" attribute. The "total count" is the summed total number of APs found in the first scan and the second scan. Another attribute is the "union size" attribute. The "union size" attribute is the number of APs in the union between APs seen in the first scan and the second scan. The "intersection size" attribute is the number of APs in the intersection between APs seen in the first scan and the second scan. The "intersection ratio" attribute is the ratio of the intersection size to union size. The "average difference" attribute is another possible attribute for the comparison. The "average difference" attribute is the average difference between signal strengths for APs within range of the mobile computing device. The "minimum difference" attribute is the smallest difference between signal strengths for APs. The attributes "signal strength 0" through "signal strength 9" are equal to the signal strength of the various discover APs. The "signal strength 0" through "signal strength 9" attributes are sorted based on the strongest signals to the least strong signals. The attributes "signal strength norm 0" through "signal strength norm 9" represent the norms (i.e. absolute difference) for the signals in the same order as attributes "signal strength 0" through "signal strength 9". The attributes "sorted signal strength norm 1_0" through "sorted signal strength norm 1_9" are the norms (similar to attributes "signal strength norm 0" through "signal strength norm 9") sorted from the smallest to the largest norm. For values that don't exist, the attribute may be equal to 100. The attributes "mean signal strength 0" through "mean signal strength 9" are equal to the mean signal strength of the APs in the same order as the attributes "sorted signal strength norm 1_0" through "sorted signal strength norm 1_9". In various other embodiments, different sets of attributes may be calculated for the two scans.

At block 403, the mobile computing device, based on the attribute comparison, determines a distance between a position associated with the reference set of network attributes and a position associated with the wireless scan. The determining may be performed based on the previously-discussed classifier (e.g. learning algorithm). In one embodiment, the mobile device has been provided with a functional relationship between the attributes and the distance between the two scans. The functional relationship may have been calculated by a networked computer server and communicated to the mobile computing device. Thus, the determination may be made directly on the mobile computing device.

In another embodiment, the mobile computing device may communicate the parameters to a networked computer server. The networked computer server may calculate the distance between the two scans and return the distance to the mobile device. In either embodiment, the distance may be calculated based only on the parameters of the two scans (without the use of any absolute position information).

Figure 5:
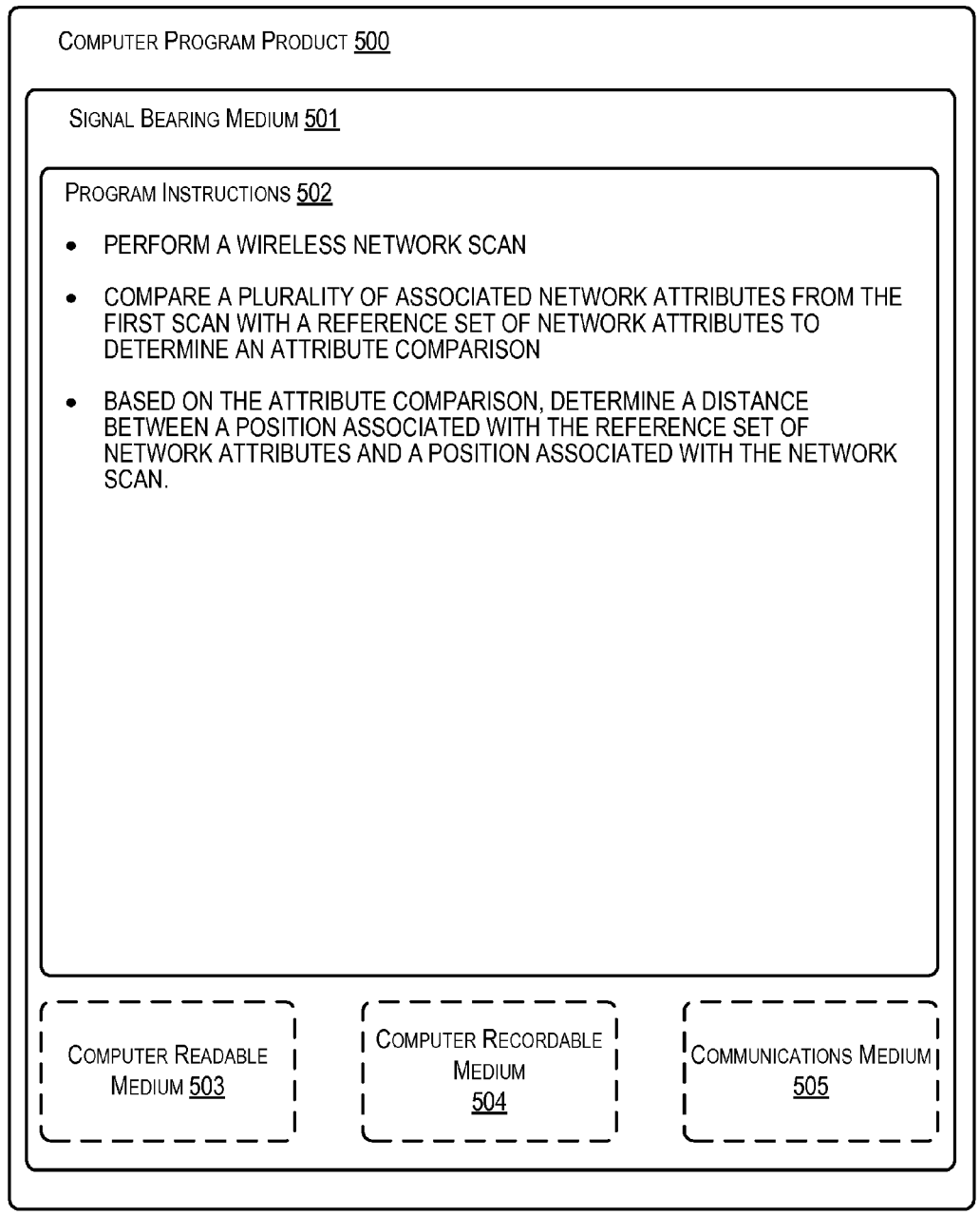
FIG. 5 illustrates an example computer readable medium configured for predicting the distance between a pair of wireless scans.

In some embodiments, the disclosed methods may be implemented as computer program instructions encoded on a computer-readable storage media in a machine-readable format, or on other non-transitory media or articles of manufacture. FIG. 5 is a schematic illustrating a conceptual partial view of an example computer program product 500 that includes a computer program for executing a computer process on a computing device, arranged according to at least some embodiments presented herein. In one embodiment, the example computer program product 500 is provided using a signal bearing medium 501. The signal bearing medium 501 may include one or more program instructions 502 that, when executed by one or more processors (e.g., processor 113 in the computing device 111) may provide functionality or portions of the functionality described above with respect to FIGS. 1-4. Thus, for example, referring to the embodiments shown in FIG. 4, one or more features of blocks 402-410 may be undertaken by one or more instructions associated with the signal bearing medium 501. In addition, the program instructions 502 in FIG. 5 describe example instructions as well.

In some examples, the signal bearing medium 501 may encompass a computer-readable medium 503, such as, but not limited to, a hard disk drive, a Compact Disc (CD), a Digital Video Disk (DVD), a digital tape, memory, etc. In some implementations, the signal bearing medium 501 may encompass a computer recordable medium 504, such as, but not limited to, memory, read/write (R/W) CDs, R/W DVDs, etc. In some implementations, the signal bearing medium 501 may encompass a communications medium 505, such as, but not limited to, a digital and/or an analog communication medium (e.g., a fiber optic cable, a waveguide, a wired communications link, a wireless communication link, etc.). Thus, for example, the signal bearing medium 501 may be conveyed by a wireless form of the communications medium 505 (e.g., a wireless communications medium conforming to the IEEE 802.11 standard or other transmission protocol).

The one or more programming instructions 502 may be, for example, computer executable and/or logic implemented instructions. In some examples, a computing device such as the computing device described with respect to FIGS. 1-4 may be configured to provide various operations, functions, or actions in response to the programming instructions 502 conveyed to the computing device by one or more of the computer readable medium 503, the computer recordable medium 504, and/or the communications medium 505. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration only and are not intended to be limiting, with the true scope and spirit being indicated by the following claims.

What is claimed is:

1. A method comprising:
receiving information related to a scan for wireless networks performed with a computing device, wherein the information includes a plurality of network attributes for a plurality of wireless networks, wherein the plurality of network attributes include data related to a received power of a radio signal from a wireless base station for respective wireless networks of the plurality of wireless networks and a unique identification for respective wireless networks of the plurality of wireless networks;
comparing the plurality of network attributes with a reference set of network attributes to determine an attribute comparison, wherein the reference set of network attributes comprises a reference received power for respective reference wireless networks of a plurality of reference wireless networks and a unique identification for respective reference wireless networks of the plurality of reference wireless networks, wherein comparing the plurality of network attributes comprises determining a difference of an average received power of the received power for each wireless network of the plurality of wireless networks and an average received power of the reference wireless networks; and
determining a distance between a location from which a reference scan associated with the reference set of network attributes was performed and a location from which the scan associated with the plurality of network attributes was performed, wherein the determining is based on a correlation between the attribute comparison and a set of previously-captured attribute comparisons, wherein the set of previously-captured attribute comparisons is based on a plurality of previously-captured wireless scans.

2. The method of claim 1, further comprising scanning for wireless networks with the computing device to receive the reference set of network attributes for the plurality of reference wireless networks.

3. The method of claim 2, wherein the reference set of network attributes are stored in a memory.

4. The method of claim 1, wherein comparing the plurality of network attributes comprises determining a union of each of the plurality of wireless networks from the scanning and each of a plurality of reference wireless networks from the reference set of network attributes.

5. The method of claim 1, wherein comparing the plurality of network attributes comprises determining an intersection of each of the plurality of wireless networks from the scanning and each of a plurality of reference wireless networks from the reference set of network attributes.

6. The method of claim 1, wherein the plurality of network attributes do not include absolute location information.

7. A system comprising:
at least one processor; and
a memory having stored thereon instructions that, upon execution by the at least one processor, cause the system to perform functions comprising:
scanning for wireless networks to receive a plurality of network attributes for a plurality of wireless networks, wherein the plurality of network attributes include a received power of a radio signal from a wireless base station for respective wireless networks of the plurality of wireless networks and a unique identification for respective wireless networks of the plurality of wireless networks;
comparing the plurality of network attributes with a reference set of network attributes to determine an attribute comparison, wherein the reference set of network attributes comprises a reference received power for respective reference wireless networks of a plurality of reference wireless networks and a unique identification for respective reference wireless networks of the plurality of reference wireless networks, wherein comparing the plurality of network attributes comprises determining a difference of an average received power of the received power for each wireless network of the plurality of wireless networks and an average received power of the reference wireless networks; and based on the attribute comparison, determining, with the computing device, a distance between a location from which a reference scanning associated with the reference set of network attributes was performed and a location from which the wireless scan was performed, wherein the determining is based on a network attribute correlation between the attribute comparison and a set of previously-captured attribute comparisons, wherein the set of previously-captured attribute comparisons are based on a plurality of previously-captured wireless scans.

8. The control system of claim 7, further comprising storing data for the reference set of network attributes.

9. The control system of claim 8, wherein in the data is stored based on the reference scanning for wireless networks with a computing device.

10. The control system of claim 7, wherein the comparing the plurality of network attributes comprises determining a union of each of the plurality of wireless networks from the scanning and each of a plurality of reference wireless networks from the reference set of network attributes.

11. The control system of claim 7, wherein the comparing the plurality of network attributes comprises determining an intersection of each of the plurality of wireless networks from the scanning and each of a plurality of reference wireless networks from the reference set of network attributes.

12. The control system of claim 7, wherein the plurality of network attributes do not include absolute location information.

13. An apparatus comprising:
a wireless chipset configured to scan for wireless networks and a set of associated network attributes for each wireless network;
a memory configured to:
store data associated with the scan for wireless networks and the associated network attributes for each wireless network, wherein the network attributes comprise a plurality of network attributes for each of a plurality of wireless networks, wherein the network attributes include a received power of a radio signal from a wireless base station for respective wireless networks of the plurality of wireless networks and a unique identification for each wireless network of the plurality of wireless networks;
store data associated with a reference set of network attributes, wherein the data associated with a reference set of network attributes comprises a reference power for each reference wireless network of the plurality of reference wireless networks and a unique identification for each reference wireless network of the plurality of reference wireless networks;
at least one processor configured to:
compare the plurality of network attributes from the scanning with the reference set of network attributes to determine an attribute comparison, wherein comparing the plurality of network attributes comprises determining a difference of an average received power of the received power for each wireless network of the plurality of wireless networks and an average received power of the reference wireless networks; and
determine a distance between a location from which a reference scanning associated with the reference set of network attributes was performed and a location from which the scanning associated with the plurality of network attributes was performed, wherein the determining is based on a correlation between the attribute comparison and a set of previously-captured attribute comparisons, wherein the set of previously-captured attribute comparisons are based on a plurality of previously-captured wireless scans.

14. The apparatus of claim 13, wherein the data associated with a reference set of network attributes is stored based on the reference scanning for wireless networks with a computing device.

15. The apparatus of claim 13, wherein the comparing the plurality of network attributes comprises determining a union of each of the plurality of wireless networks from the scanning and each of a plurality of reference wireless networks from the reference set of network attributes.

16. The apparatus of claim 13, wherein the comparing the plurality of network attributes comprises determining an intersection of each of the plurality of wireless networks from the scanning and each of a plurality of reference wireless networks from the reference set of network attributes.

17. The apparatus of claim 13, wherein the plurality of network attributes do not include absolute location information.

* * * * *